US008925175B2

(12) United States Patent
Aldred et al.

(10) Patent No.: US 8,925,175 B2
(45) Date of Patent: Jan. 6, 2015

(54) DEVICE AND METHOD TO ACCURATELY AND EASILY ASSEMBLE GLASS SLIDES

(75) Inventors: Jeff Aldred, Boulder, CO (US); Tracy R Keeney, Firestone, CO (US); Jonathan Vaught, Boulder, CO (US); Chris Bock, Durham, NC (US); Stephan Kraemer, Boulder, CO (US); Alexis Stuart Foreman, Boulder, CO (US)

(73) Assignee: SomaLogic, Inc., Boulder, CO (US)

( * ) Notice: Subject to any disclaimer, the term of this patent is extended or adjusted under 35 U.S.C. 154(b) by 0 days.

(21) Appl. No.: 14/238,695

(22) PCT Filed: Aug. 17, 2012

(86) PCT No.: PCT/US2012/051400
§ 371 (c)(1),
(2), (4) Date: Feb. 12, 2014

(87) PCT Pub. No.: WO2013/026013
PCT Pub. Date: Feb. 21, 2013

(65) Prior Publication Data
US 2014/0201965 A1  Jul. 24, 2014

Related U.S. Application Data

(60) Provisional application No. 61/525,056, filed on Aug. 18, 2011.

(51) Int. Cl.
| | |
|---|---|
| *B25B 11/02* | (2006.01) |
| *B23P 19/04* | (2006.01) |
| *B23P 19/10* | (2006.01) |
| *B01L 9/00* | (2006.01) |
| *G02B 21/34* | (2006.01) |
| *B25B 11/00* | (2006.01) |

(52) U.S. Cl.
CPC .................. *B23P 19/04* (2013.01); *B23P 19/10* (2013.01); *B25B 11/005* (2013.01); *B25B 11/02* (2013.01); *B25B 11/007* (2013.01); *B01L 9/52* (2013.01); *G02B 21/34* (2013.01); *B01L 2200/025* (2013.01); *B01L 2300/0636* (2013.01); *B01L 2300/0822* (2013.01)
USPC .................... 29/434; 29/559; 29/743; 269/21

(58) Field of Classification Search
CPC ....... B23P 19/10; B25B 11/005; B25B 11/02; B25B 11/007
USPC ............ 29/434, 559, 743, 281.4; 269/21, 297
See application file for complete search history.

(56) References Cited

U.S. PATENT DOCUMENTS 5,451,500 A    9/1995  Stapleton
(Continued)

OTHER PUBLICATIONS

International Search Report and Written Opinion dated Nov. 8, 2012 for International Patent Application No. PCT/US2012/051400.

(Continued)

*Primary Examiner* — Jermie Cozart
(74) *Attorney, Agent, or Firm* — Swanson & Bratschun, L.L.C.

(57) ABSTRACT

Embodiments provide a slide assembly device having a static tooling base which is statically and solidly affixed to a base such as a table and a moveable tooling arm that is rotatable about a hinge connected to the static tooling base, so that moveable tooling arm rotates about the hinge in a manner similar to a book cover opening and closing. The embodiments further provide an upper slide chuck that is removably attachable to the moveable tooling arm and a lower slide receiver that is removably attachable to the static tooling base. The upper slide chuck is configured to hold an experimental slide via a vacuum mechanism to engagedly hold the experimental slide to the upper slide chuck while the moveable tooling arm is rotated about the hinge from an open-book position to a closed-book position.

18 Claims, 11 Drawing Sheets

(56) References Cited

U.S. PATENT DOCUMENTS

| | | |
|---|---|---|
| 7,838,283 B2 | 11/2010 | Erickson |
| 2003/0013184 A1 | 1/2003 | Streit |
| 2008/0286753 A1 | 11/2008 | Erickson |
| 2010/0167943 A1 * | 7/2010 | Adey et al. ............ 506/9 |

OTHER PUBLICATIONS

English Translation of Japanese Office Action dated Jul. 31, 2014 for corresponding Japanese Patent Application No. 2014-526251.

NimbleGen Arrays User's Guide: CGX Arrays v3.1, 2012, Roche NimbleGen, Inc.

* cited by examiner

DEVICE AND METHOD TO ACCURATELY AND EASILY ASSEMBLE GLASS SLIDES

RELATED APPLICATIONS

This application is a 35 U.S.C. §371 national phase application of PCT/US 12/51400 (WO 2013/026013), filed on Aug. 17, 2012, entitled "Device and Method to Accurately and Easily Assemble Glass Slides", which application claims the benefit of U.S. Provisional Application Ser. No. 61/525,056, filed Aug. 18, 2011, which is incorporated herein by reference in its entirety.

TECHNICAL FIELD

Embodiments of the present invention relate generally to laboratory devices and more specifically to systems and methods for the preparation and assembly of slide arrays for further experimentation.

SUMMARY OF THE EMBODIMENTS

According to some embodiments of the present invention, a device accepts a slide array that is to be assembled. A book-like hinged device can be constructed such that two surfaces with location points are exposed to facilitate the loading of two separate slides. One leaf of the book-like device is constructed such that it is a fixed mounting surface placed upon a bench top or other such piece of furniture. The other leaf of the book-like device is moveable from a fully open configuration to a full closed configuration, approximately 180 degrees of motion. Upon closing the hinge, the action brings two slides together in an accurate, repeatable, and easily managed manner. In the preferred configuration, a vacuum chuck on the moveable leaf of the book-like device holds a moveable slide firmly in place prior to its placement on top of a fixed slide. A spring loaded catch on the upper, moveable portion of the device can also maintain a hold on a slide during operation. The vacuum is applied on command of the operator. The closing of the book-like device brings the moving slide and the fixed slide into close but not intimate contact. Once the operator releases the vacuum upon command, the two slides are brought into final, resting position with a minimum of impact.

According to some embodiments of the present invention, the slide array is to be assembled inside of a separate carrier to allow further processing. The fixed slide is to be assembled inside of the carrier and then placed on a tooled spot on the fixed leaf of the book-like device. Further processing can include the application of an additional carrier on the top slide and the addition of a screw-type clamp to fixate the slide array.

According to some embodiments of the present invention, the slides described herein are composed of a transparent glass. The invention is not limited to the size of glass slide normally encountered in normal laboratory operations. The slides can be of a large variety of sizes and shapes. The slides need not be of identical sizes, smaller slides can be placed on a larger slide or vice versa. The slides need not be composed of transparent glass, other materials such as metals or plastics can be accurately assembled using the herein described device.

Various modifications and additions can be made to the exemplary embodiments discussed without departing from the scope of the present invention. For example, while the embodiments described above refer to particular features, the scope of this invention also included embodiments having different combination of features and embodiments that do not include all of the above described features.

DETAILED DESCRIPTION

Unless otherwise indicated, all numbers expressing quantities of ingredients, dimensions reaction conditions and so forth used in the specification and claims are to be understood as being modified in all instances by the term "about."

In this application and the claims, the use of the singular includes the plural unless specifically stated otherwise. In addition, use of "or" means "and/or" unless stated otherwise. Moreover, the use of the term "including," as well as other forms, such as "includes" and "included," is not limiting. Also, terms such as "element" or "component" encompass both elements and components comprising one unit and elements and components that comprise more than one unit unless specifically stated otherwise.

Figure 1:
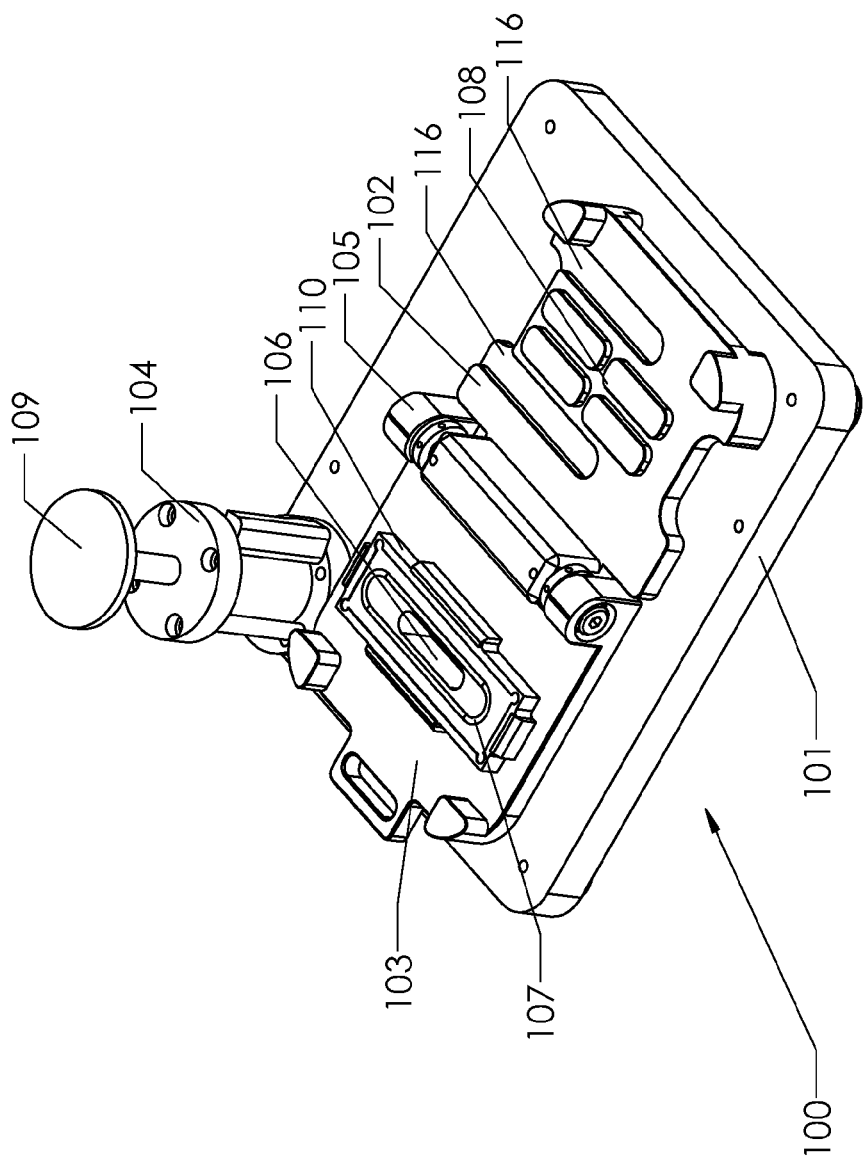
FIG. 1 illustrates an accurate slide assembly device 100, according to the embodiments of the present invention.

With reference to FIG. 1, the Accurate Slide Assembly Device (ASAD) 100 consists of a base 101 whereby the static slide assembly tooling base 102 is solidly affixed in place, according to the embodiments of the present invention. Attached to the tooling base 102 is the moveable arm 103 via hinge 105 that keeps the respective tooling points, lower hybridization tooling area 108 and upper slide chuck 110, in accurate registration or alignment with one another, according to the embodiments of the present invention.

Figure 2:
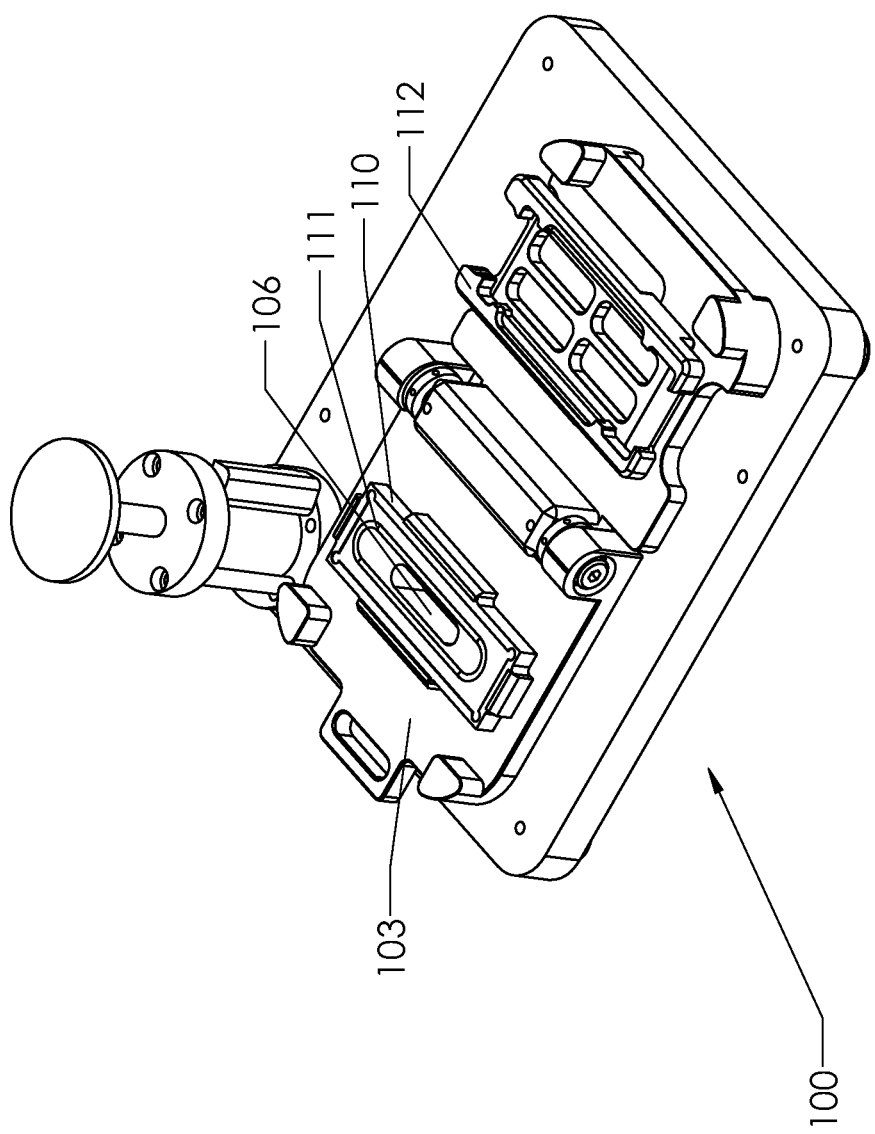
FIG. 2 illustrates an accurate slide assembly device 100, with a Hybridization chamber base installed in the loading position, according to the embodiments of the present invention.
Figure 4:
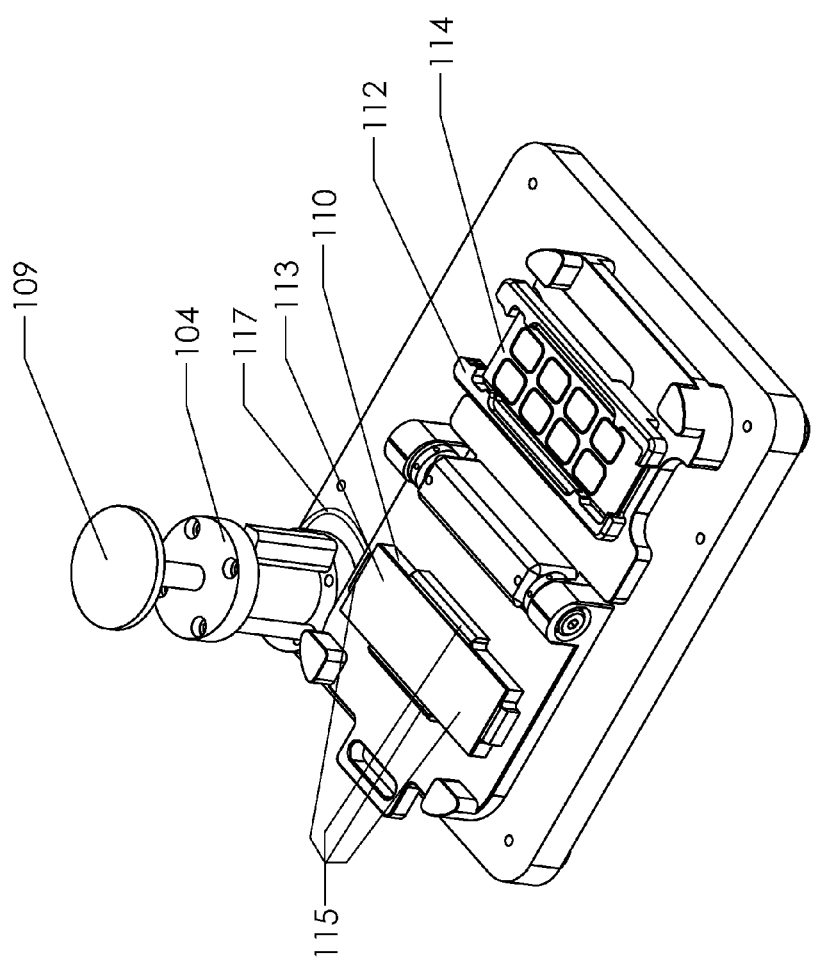
FIG. 4 illustrates an accurate slide assembly device 100, with an experimental slide loaded into the vacuum chuck on the moveable arm, according to the embodiments of the present invention.

With reference to FIGS. 1, 2, and 4, Groove 107 (as shown in FIG. 1) allows the placement of a flexible seal 111 (as shown in FIG. 2), such as an o-ring, into the upper slide chuck 110 to provide a vacuum to be held in the vacuum space 106 once an experimental slide 113 (as shown in FIG. 4) has been placed in the upper slide chuck 110, according to the embodiments of the present invention. With reference to FIG. 4, hard tooling points 115 fix the experimental slide 113 in a tightly constrained location, according to the embodiments of the present invention.

Figure 3:
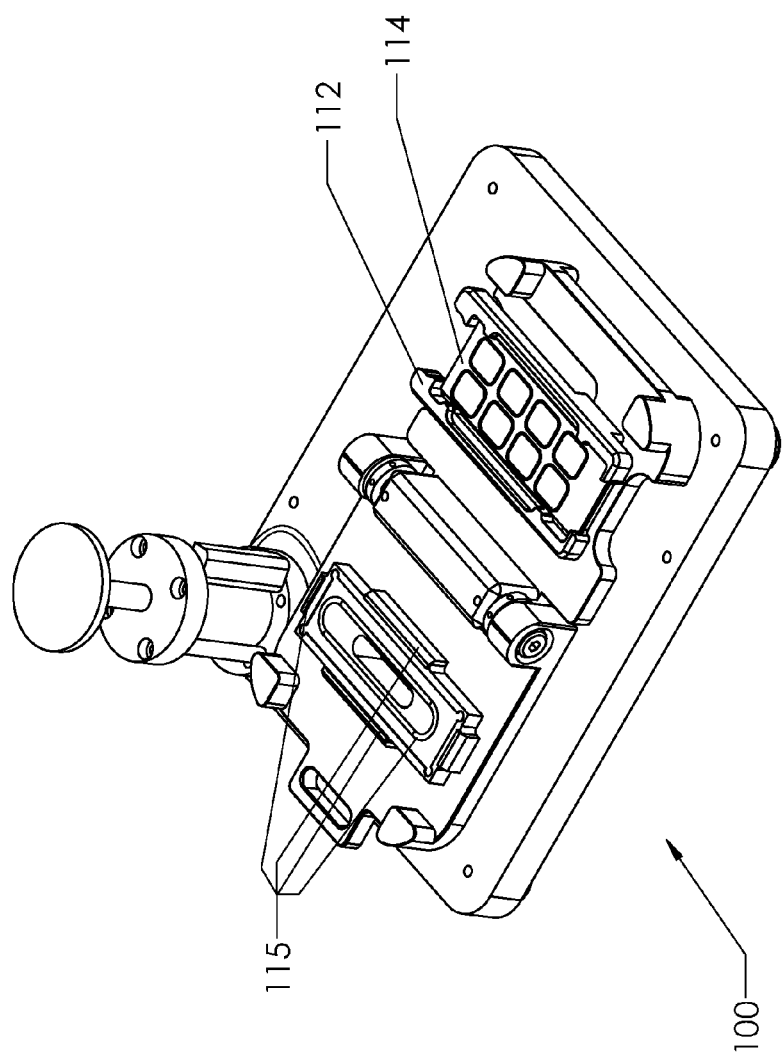
FIG. 3 illustrates an accurate slide assembly device 100, with a hybridization gasket slide loaded into the Hybridization chamber base, according to the embodiments of the present invention.

With reference to FIG. 3, lower slide receiver 112 is the part of the Hybridization chamber base fixture that receives the hybridization gasket slide 114. Hybridization gasket slide 114 preferably includes several of chambers thereon in which material for processing may be added. Each chamber may be surrounded by a gasket or a flexible seal (similar to the flexible seal 111 above). Once the hybridization gasket slide 114 has been prepared by adding material to the surface, the operation of the ASAD 100 can commence, according to the embodiments of the present invention.

Figure 5:
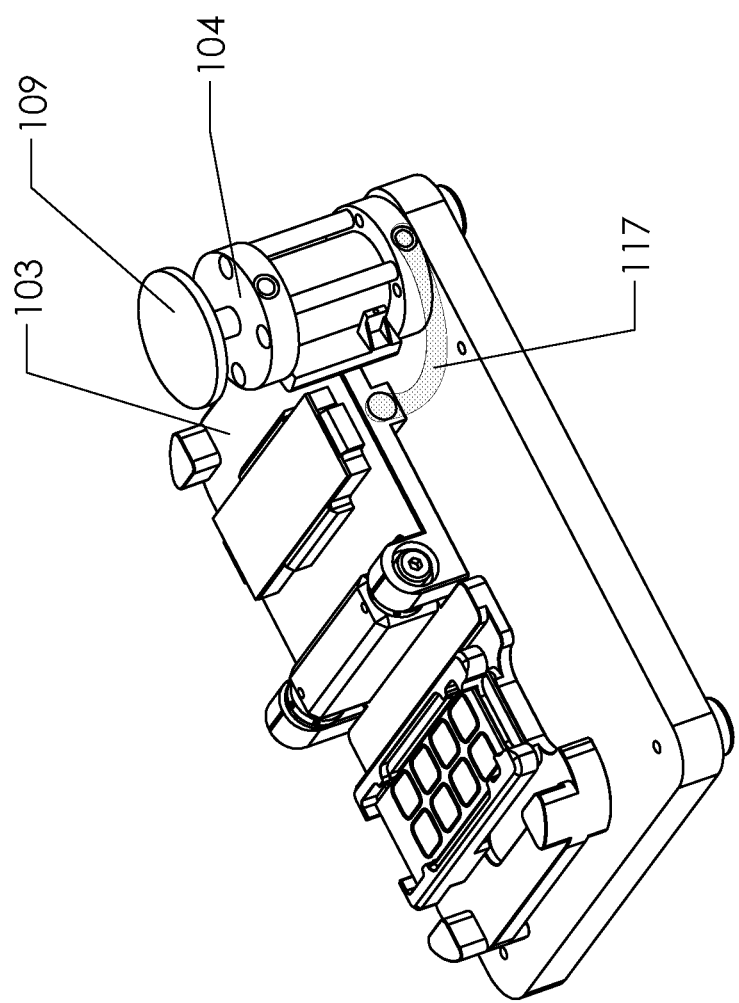
FIG. 5 illustrates an accurate slide assembly device 100, with the vacuum producing cylinder depressed, according to the embodiments of the present invention.
Figure 6:
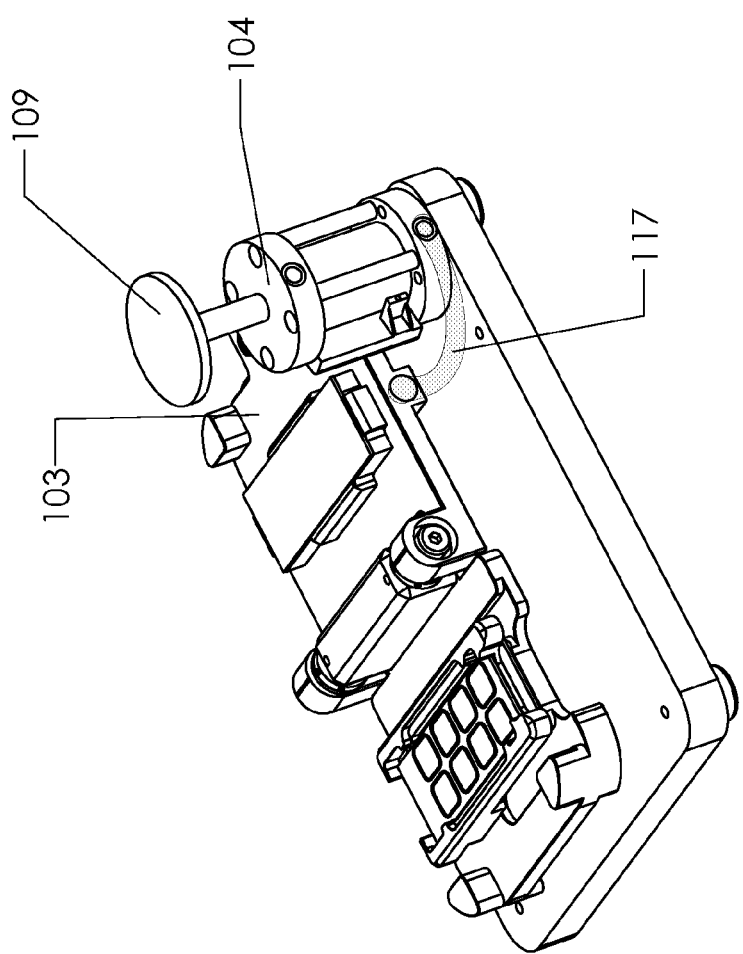
FIG. 6 illustrates an accurate slide assembly device 100, with the vacuum producing cylinder extended after release, producing a vacuum under the experimental slide, according to the embodiments of the present invention.

With reference again to FIG. 4, the experimental slide 113 is held in place against the o-ring 111 (as shown in FIG. 2) after a vacuum is imposed in the open volume or vacuum space 106 (as shown in FIGS. 1 & 2). In the present configuration, as illustrated in FIGS. 4-6, the vacuum is generated by manually pushing button 109 down on the spring return cylinder 104 and then releasing the button 109 to allow the spring to drive the piston inside of the cylinder 104 upwards. A flexible tube 117 connects the cylinder generated vacuum to the open volume or vacuum space 106 (as shown in FIGS. 1 & 2) in the moveable arm 103, according to the embodiments of the present invention.

Figure 7:
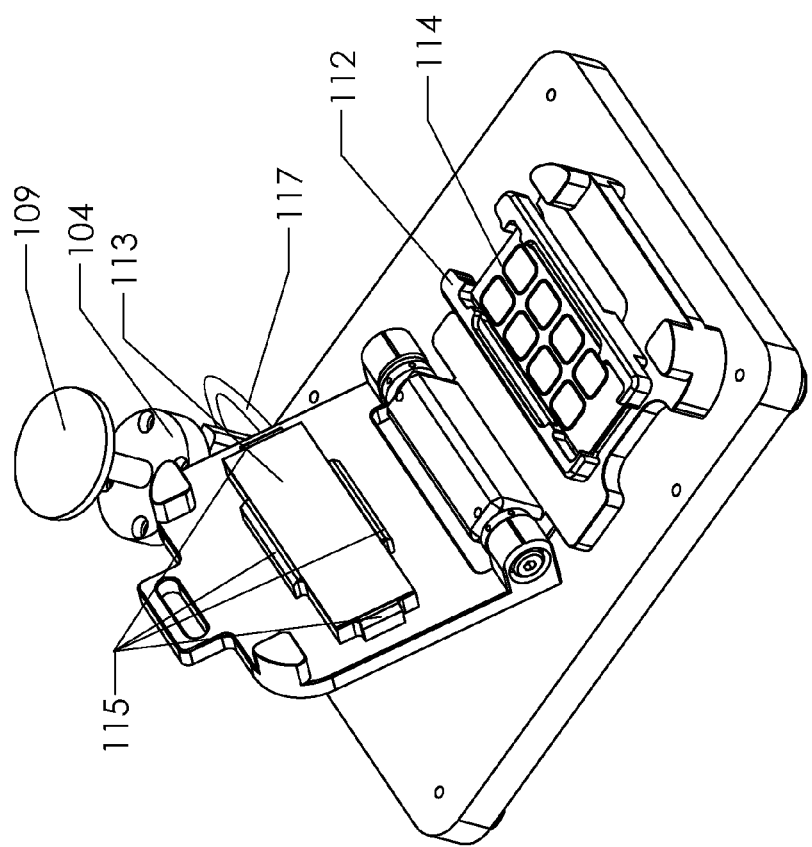
FIG. 7 illustrates an accurate slide assembly device 100, with the moveable arm partly rotated into the slide dropping position, according to the embodiments of the present invention.
Figure 8:
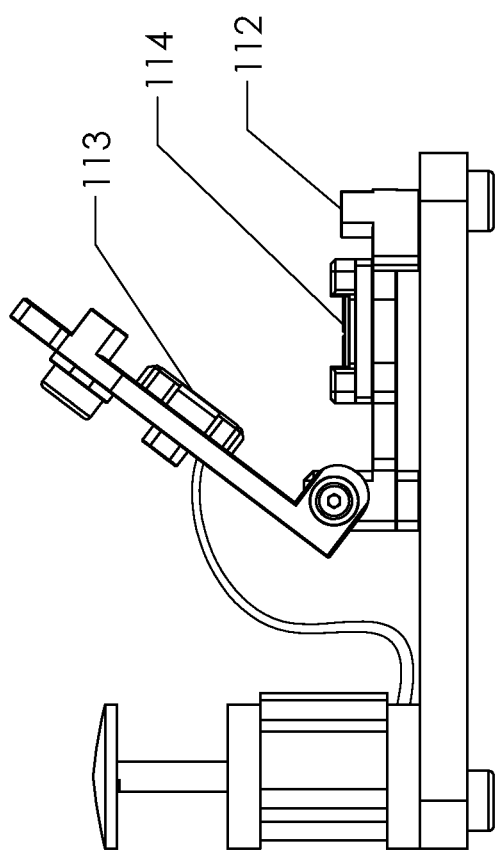
FIG. 8 illustrates an accurate slide assembly device 100, with the moveable arm further deployed into the slide dropping position, according to the embodiments of the present invention.
Figure 9:
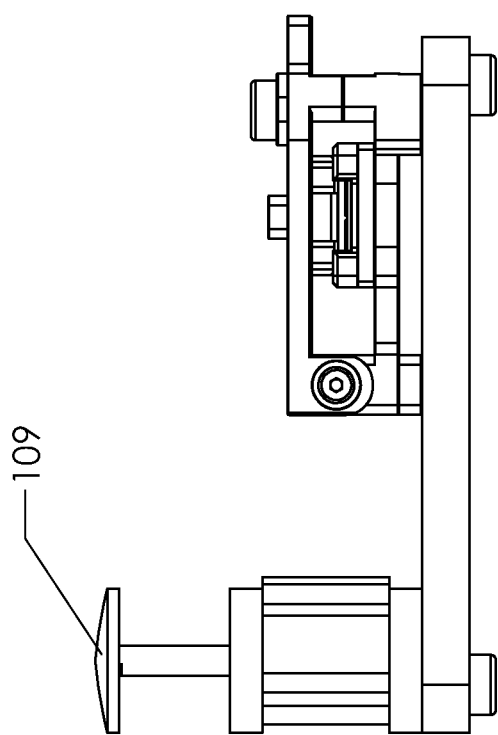
FIG. 9 illustrates an accurate slide assembly device 100, with the moveable arm in its final position prior to the release of the experimental slide, according to the embodiments of the present invention.

With reference to FIGS. 7-9, once the experimental slide 113 is firmly seated against the o-ring 111 (as shown in FIG. 2) and sufficiently registered in the hard tooling points 115, the moveable arm 103 can be articulated by rotation and the experimental slide 113 can be placed over the hybridization gasket slide 114 and inside of the lower slide receiver 112, according to the embodiments of the present invention. The moveable slide (e.g., experimental slide 113 in this embodiment) is located in a controlled position so that as the slides (e.g., experimental slide 113 and hybridization gasket slide 114 in this embodiment) are brought into close proximity with each other, there will be no interference with the removable tooling (e.g., lower slide receiver 112 in this embodiment) or the stationary slide (e.g., hybridization gasket slide 114 in this embodiment). This location is provided in the present, preferred configuration by raised surfaces that are carefully designed to press against the periphery of the moveable slide, without interfering with the rest of the tooling or the fixed slide.

Figure 10:
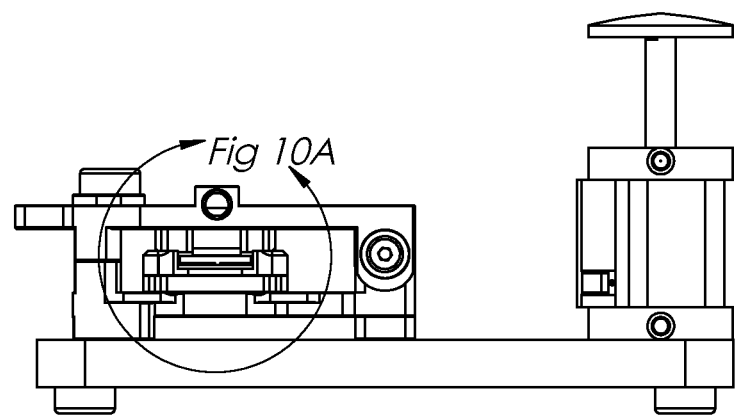
FIG. 10 illustrates a detailed view of an accurate slide assembly device 100, with the experimental slide still held on the vacuum chuck slightly above the hybridization gasket slide just prior to final placement, according to the embodiments of the present invention.
Figure 10A:
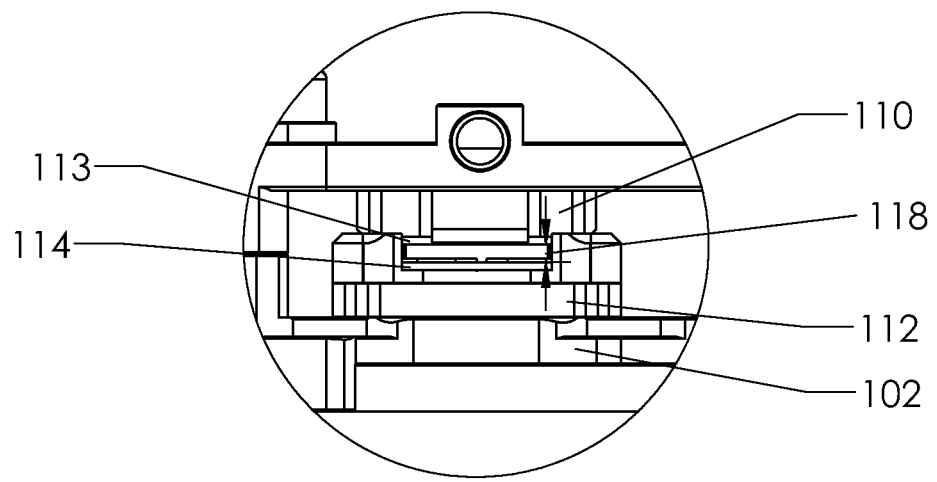
Figure 11:
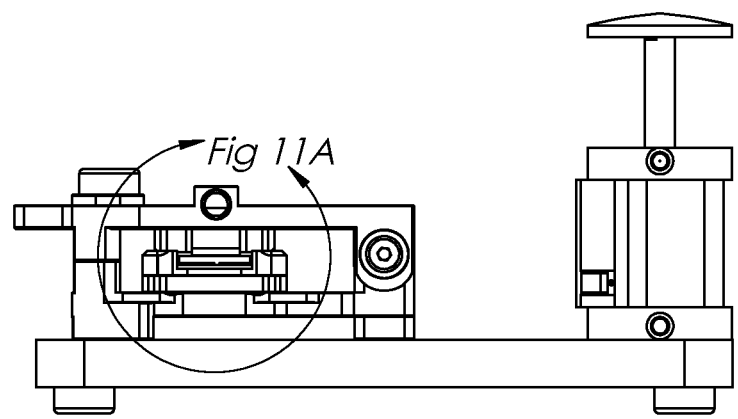
FIG. 11 illustrates an accurate slide assembly device 100, with the experimental slide and the hybridization gasket slide in contact after the release of the vacuum in the vacuum chuck, according to the embodiments of the present invention.
Figure 11A:
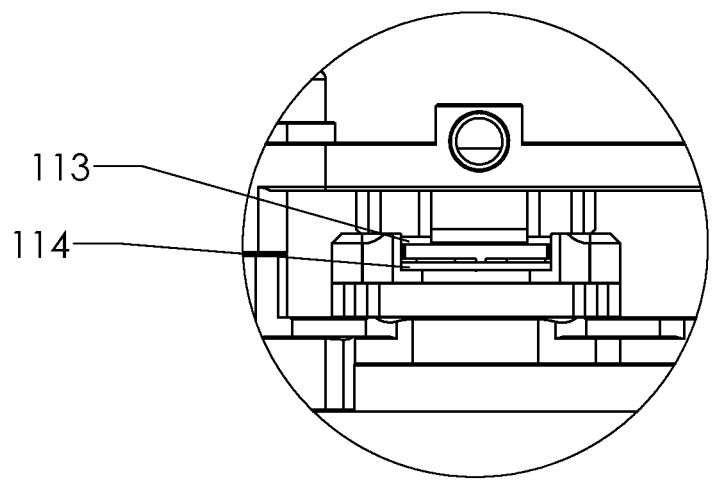

With reference to FIGS. 10 & 11, the experimental slide 113 can then be released by depressing the button 109 (as shown in FIGS. 1-9) and allowing the cylinder spring to drive the cylinder 104 to its neutral state. This action causes the vacuum to be released to atmospheric pressure and the experimental slide 113 falls onto the hybridization gasket slide 114 under the force of gravity, according to the embodiments of the present invention.

With reference again to FIG. 10, the small distance 118 between the experimental slide 113 and the hybridization gasket slide 114 allows the eventual placement of the experimental slide 113 and the hybridization gasket slide 114 (as illustrated in FIG. 11) to be gentle and non-disruptive event, according to the embodiments of the present invention. In this embodiment, the distance 118 is preferably, but not limited to, a distance on the order of about 1 millimeter or less.

With reference once more to FIG. 1, the grooves 116 that are placed in static slide assembly tooling base 102 are present to allow a clamp (not shown) to be applied onto a stack of hybridization base, hybridization gasket slide, printed slide and the hybridization chamber top in order to fixate the two slides (as shown in FIG. 11) one on top of the other and held in place by the hybridization top in order to facilitate further processing, according to the embodiments of the present invention. Once gravity has brought the upper slide (i.e., experimental slide 113) into contact with the lower slide (i.e., hybridization gasket slide 114), it is possible to clamp the slides together without disturbing the orientation thereof. The device may now be used to repeatably fixate other pairs of slides.

The Accurate Slide Assembly Device (ASAD) 100 is intended to take a first prepared or otherwise unused slide (including, but not limited to, experimental slide 113) and place it in close proximity in a parallel attitude to a second prepared or otherwise unused slide (including, but not limited to, hybridization gasket slide 114). Prior to positioning in either upper slide chuck 110 or the lower slide receiver 112, either of the first and second slides may be used or unused, prepared or unprepared, already processed or not yet processed.

In the above-described embodiment, vacuum was provided using the assembly—comprising the manually actuated button 109 and spring return cylinder 104—that is connected to the o-ring-lined upper slide chuck 110 via flexible tube 117. This, however, is not the only method of supplying a vacuum to the ASAD 100. Other sources of vacuum include, but are not limited to, an external source that can be piped to the instrument, an on-board source that can be generated with a bulb commonly found in laboratories used for operating pipettes, and an air cylinder that is manually operated to provide a sufficient vacuum to pull the slide against an o-ring. The required vacuum pressure is on the order of inches of water (or about 2.5 to 25 mbar).

For the above-described embodiment, releasing the vacuum to atmospheric pressure may be accomplished via use of one of numerous valving options that are known to those skilled in the art.

In the above-described embodiment, the device is manually operated, but the device may be configured to operate robotically in ways known to those skilled in the art. In the above-described embodiment, a single hinge 105 is used, because it is the easiest configuration, but a combination of hinges and slides may also be built into the device to accomplish the same or similar task. Either slides, hinges, or both fit the task.

Although the above-described embodiment utilizes a hybridization chamber base, the device need not have a hybridization chamber base, but may simply be used to assemble the slides.

In some embodiments, the upper slide chuck 110 may be configured to be adjustably shifted along any direction within a plane that is parallel to the surface of the moveable arm 103, in order to allow for ease of alignment between the experimental slide 113 and hybridization gasket slide 114 when the moveable is rotated to a position above the static tooling base.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A slide assembly device for repeatably and accurately aligning and assembling a first slide and a second slide into an assembled slide for subsequent processing of the assembled slide, the device comprising:
    a static tooling base having a first surface;
    a connection module;
    a moveable tooling base that is operably connected with the static tooling base via the connection module, said moveable tooling base having a second surface;
    wherein the moveable tooling base is configured to rotate about the connection module from a first position that is parallel, and in line, with the static tooling base to a second position that is substantially 180 degrees with respect to the first position, such that the second surface becomes parallel with, and oriented to face, the first surface;
    wherein the static tooling base is configured to hold the first slide on the first surface;
    wherein the moveable tooling base is configured to hold the second slide on the second surface, such that the second slide remains held on the second surface when the moveable tooling base is rotated from the first position to the second position; and
    wherein when the moveable tooling base is in the second position, the slide assembly device is configured to release the second slide onto the first slide.

2. The slide assembly device as in claim 1, further comprising a base to which the static tooling base is affixed.

3. The slide assembly device as in claim 2, wherein the base is mounted on a mounting.

4. The slide assembly device as in claim 1, wherein the connection module comprises a hinge.

5. The slide assembly device as in claim 1, further comprising a first slide receiver that is removably attachable to the first surface of the static tooling base, wherein the first slide receiver comprises a third surface, and wherein the first slide receiver is configured to hold the first slide on the third surface.

6. The slide assembly device as in claim 5, further comprising a hybridization chamber base affixed on the first surface of the static tooling base, wherein the first slide receiver is configured to be part of the hybridization chamber base.

7. The slide assembly device as in claim 5, further comprising a second slide receiver that is removably attachable to the second surface of the moveable tooling base, wherein the second slide comprises a fourth surface, and wherein the second slide receiver is configured to hold the second slide on the fourth surface, such that the second slide remains held on the fourth surface when the moveable tooling base is rotated from the first position to the second position.

8. The slide assembly device as in claim 7, further comprising a vacuum source, wherein the vacuum source is configured to generate a vacuum sufficient to hold the second slide on the fourth surface when the moveable tooling base is rotated from the first position to the second position, and configured to release the vacuum to atmospheric pressure when the moveable tooling base is in the second position, so as to release the second slide onto the first slide by force of gravity.

9. The slide assembly device as in claim 8, wherein the fourth surface has a groove thereon, and wherein the second slide receiver further comprises:
    a vacuum opening in the fourth surface, wherein the groove forms a closed path around said vacuum opening, and wherein a flexible seal is fitted within the groove;
    a vacuum connection to which the vacuum source is connected;
    a vacuum path under the fourth surface, said vacuum path being configured between the vacuum opening and the vacuum connection,
    wherein the second slide receiver is configured to hold the second slide against the flexible seal on the fourth surface, using the vacuum generated by the vacuum source, when the moveable tooling base is rotated from the first position to the second position.

10. The slide assembly device as in claim 1, wherein the slide assembly device is configured such that, when the moveable tooling base is in the second position, a distance between the first slide and the second slide is about 1 mm or less.

11. The slide assembly device as in claim 1, wherein the static tooling base comprises extraction grooves thereon that are configured to allow an extraction device to be positioned between the static tooling base and the assembled slide in order to remove the assembled slide from the slide assembly device.

12. A method of repeatably and accurately aligning and assembling a first slide and a second slide into an assembled slide for subsequent processing of the assembled slide, the method comprising:
    providing a slide assembly device comprising:
        a static tooling base having a first surface;
        a connection module;
        a moveable tooling base that is operably connected with the static tooling base via the connection module, said moveable tooling base having a second surface;
        wherein the moveable tooling base is configured to rotate about the connection module from a first position that is parallel, and in line, with the static tooling base to a second position that is substantially 180 degrees with respect to the first position, such that the second surface becomes parallel with, and oriented to face, the first surface;
        wherein the static tooling base is configured to hold the first slide on the first surface; and
        wherein the moveable tooling base is configured to hold the second slide on the second surface;
    positioning the first slide on the static tooling base;
    positioning the second slide on the moveable tooling base;
    causing the slide assembly device to hold the second slide on the second surface, such that the second slide does not move with respect to the second surface even when the moveable tooling base is moved;
    rotating the moveable tooling base about the connection module from the first position to the second position; and
    causing the slide assembly device to release the second slide onto the first slide when the moveable tooling base is in the second position.

13. The method as in claim 12, further comprising mounting the static tooling base on a base, prior to the steps of positioning the first slide on the static tooling base and positioning the second slide on the moveable tooling base.

14. The method as in claim 13, further comprising mounting the base on a mounting, prior to mounting the static tooling base on the base.

15. The method as in claim 12, further comprising removably attaching a first slide receiver to the first surface of the static tooling base, prior to the step of positioning the first slide on the static tooling base, wherein the first slide receiver includes a third surface and wherein the first slide receiver is configured to hold the first slide on the third surface.

16. The method as in claim 15, wherein the slide assembly device further comprises a hybridization chamber base affixed on the first surface of the static tooling base, and wherein the first slide receiver is configured to be part of the hybridization chamber base, the method further comprising processing the second slide on the hybridization chamber base during assembly of the assembled slide.

17. The method as in claim 15, further comprising removably attaching a second slide receiver to the second surface of the moveable tooling base, prior to the step of positioning the second slide on the moveable tooling base, wherein the second slide receiver includes a fourth surface and wherein the second slide receiver is configured to hold the second slide on the fourth surface even when the moveable tooling base is moved.

18. The method as in claim 17, wherein the slide assembly device further comprises a vacuum source that is connected to the second slide receiver and that is configured to generate a vacuum sufficient to hold the second slide on the fourth surface, wherein the step of causing the slide assembly device to hold the second slide on the second surface includes causing the vacuum source to generate the vacuum in order to hold the second slide on the fourth surface during the step of rotating the moveable tooling base, and wherein the step of causing the slide assembly device to release the second slide includes causing the vacuum source to release the vacuum to atmospheric pressure.

* * * * *